US 6,713,567 B2

(12) United States Patent
Bekiarian et al.

(10) Patent No.: US 6,713,567 B2
(45) Date of Patent: Mar. 30, 2004

(54) METHOD FOR FORMING FLUORINATED IONOMERS

(75) Inventors: Paul Gregory Bekiarian, Wilmington, DE (US); William Brown Farnham, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/187,508

(22) Filed: Jul. 1, 2002

(65) Prior Publication Data

US 2003/0013816 A1 Jan. 16, 2003

Related U.S. Application Data

(60) Provisional application No. 60/305,128, filed on Jul. 13, 2001.

(51) Int. Cl.[7] .................................................. C08F 8/30
(52) U.S. Cl. ................... 525/344; 525/326.2; 526/236; 526/243; 526/248
(58) Field of Search ............................... 526/236, 248, 526/243; 525/344

(56) References Cited

U.S. PATENT DOCUMENTS

| 3,282,875 | A |   | 11/1966 | Connolly et al. |
| 3,718,627 | A | * | 2/1973  | Grot |
| 4,330,654 | A |   | 5/1982  | Ezzell et al. |
| 4,358,545 | A |   | 11/1982 | Ezzell et al. |
| 4,661,231 | A |   | 4/1987  | Matsui et al. |
| 4,940,525 | A |   | 7/1990  | Ezzell et al. |
| 5,418,091 | A |   | 5/1995  | Gozdz et al. |
| 5,595,676 | A |   | 1/1997  | Barnes et al. |
| 5,672,438 | A |   | 9/1997  | Banerjee et al. |
| 5,912,280 | A | * | 6/1999  | Anton ........................ 523/161 |
| 6,025,092 | A |   | 2/2000  | Doyle et al. |

OTHER PUBLICATIONS

Sisler et al., General Chemistry, (1949) 499, MacMillan (New York).*

* cited by examiner

Primary Examiner—Bernard Lipman

(57) ABSTRACT

This invention concerns a method for forming ionomers by treatment with ammonium carbonate of copolymers having a substantially fluorinated, but not perfluorinated, polyethylene backbone having pendant groups of fluoroalkoxy sulfonyl fluoride. Ionomers derived therefrom by ion exchange are useful in electrochemical applications such as batteries, fuel cells, electrolysis cells, ion exchange membranes, sensors, electrochemical capacitors, and modified electrodes.

15 Claims, No Drawings

METHOD FOR FORMING FLUORINATED IONOMERS

FIELD OF THE INVENTION

This invention concerns ammonium ionomers, and a method for preparing them by contacting a polymer having a substantially fluorinated, but not perfluorinated, polyethylene backbone having pendant groups of fluoroalkoxy sulfonyl fluoride, with an excess of ammonium carbonate solution. This invention further concerns a method for forming ionomers by ion exchange with ammonium ionomers. The ionomers so formed are useful in electrochemical applications such as batteries, fuel cells, electrolysis cells, ion exchange membranes, sensors, electrochemical capacitors, and modified electrodes.

BACKGROUND OF THE INVENTION

Copolymers of vinylidene fluoride (VDF) with vinyl alkoxy sulfonyl halides are known in the art.

The disclosures in Ezzell et al. (U.S. Pat. No. 4,940,525) encompass copolymers of VDF with vinyl ethoxy sulfonyl fluorides containing one ether linkage. Disclosed is a process for emulsion polymerization of tetrafluoroethylene (TFE) with the vinyl ethoxy comonomer.

Banerjee et al. (U.S. Pat. No. 5,672,438) disclose copolymers of VDF with vinyl alkoxy sulfonyl fluorides containing more than one ether linkage.

Connolly et al. (U.S. Pat. No. 3,282,875) disclose the terpolymer of VDF with perfluorosulfonyl fluoride ethoxy propyl vinyl ether (PSEPVE) and hexafluoropropylene (HFP). They broadly teach an emulsion polymerization process said to be applicable to copolymerization of vinyl ethers with any ethylenically unsaturated comonomer, with greatest applicability to fluorinated monomers.

Barnes et al. (U.S. Pat. No. 5,595,676) disclose "substantially fluorinated" copolymers of a vinyl ether cation exchange group-containing monomer with a "substantially fluorinated" alkene. The copolymer is produced by controlled addition of the alkene in emulsion polymerization, followed by hydrolysis in NaOH. PSEPVE/TFE copolymers are exemplified.

Hietala et al., J. Mater. Chem. Volume 7 pages 721–726, 1997, disclose a porous poly(vinylidene fluoride) on to which styrene is grafted by exposing the PVDF to irradiation. The styrene functionality is subsequently functionalized to sulfonic acid by exposure of the polymer to chlorosulfonic acid. The resultant acid polymer, in combination with water, provides a proton-conducting membrane.

Formation of ionomers and acid copolymers by hydrolysis of the sulfonyl fluoride functionality in copolymers of TFE and fluoro alkoxy sulfonyl fluorides is well known in the art. The art teaches exposure of the copolymer to strongly basic conditions.

See for example, Ezzell et al. U.S. Pat. No. 4,940,525, wherein is used 25 wt % NaOH(aq) for 16 hours at 80–90° C.; Banerjee et al. U.S. Pat. No. 5,672,438, wherein is used 25 wt % NaOH for 16 hours at 90° C., or, in the alternative, an aqueous solution of 6–20% alkali metal hydroxide and 5–40% polar organic liquid (e.g., DMSO) for 5 minutes at 50–100° C.; Ezzell et al. U.S. Pat. No. 4,358,545 wherein is used 0.05N NaOH for 30 minutes for 50° C.; Ezzell et al. U.S. Pat. No. 4,330,654, wherein is used 95% boiling ethanol for 30 minutes followed by addition of equal volume of 30% NaOH (aq) with heating continued for 1 hour; Marshall et al. EP 0345964 A1, wherein is used 32 wt % NaOH (aq) and methanol for 16 hours at 70° C., or, in the alternative, an aqueous solution of 11 wt % KOH and 30 wt % DMSO for 1 hour at 90° C.; and, Barnes et al. U.S. Pat. No. 5,595,676, wherein is used 20 wt % NaOH (aq) for 17 hours at 90° C.

Because of its high dielectric constant, high electrochemical stability, and desirable swelling properties, poly (vinylidene fluoride) is known in the art of lithium batteries as a highly desirable material for use as a membrane separator. For example Gozdz et al. (U.S. Pat. No. 5,418, 091) disclose porous PVDF homopolymer and copolymer containing solutions of lithium carbonates in aprotic solvents useful as separators in lithium batteries.

Porous membranes of the type described by Gozdz, however, conduct both the cation and the anion back and forth across the separator, and are thus subject to concentration polarization during use, which degrades the performance of the battery in which it is used. So-called single ion conducting polymeric membranes, wherein the ionic carbonate is attached to the polymer backbone, thereby immobilizing either the cation or the anion, offer a solution to the concentration polarization problem, and are known in the art. One particularly well-known such single ion conducting polymer is Nafion® Perfluoroionomer Resin and Membranes available from DuPont, Wilmington, Del. Nafion is a copolymer of TFE and perfluoro(3,6-dioxa-4-methyl-7-octenesulfonyl fluoride) which has been hydrolyzed by treatment with an alkali metal hydroxide according to the teachings of the art as hereinabove described.

It is further known in the art, and hereinbelow shown, that PVDF homopolymers and copolymers are subject to attack by strong bases such as the alkali metal hydroxides taught in the art hereinabove cited. Of particular importance is that the attack of basic nucleophiles on a copolymer of VDF and perfluorovinyl ethers results in the removal of the vinyl ether moiety from the polymer, see W. W. Schmiegel in Die Angewandte Makromolekulare Chemie, 76/77 pp 39ff, 1979. Since the highly preferred monomer species taught in the art, and exemplified by DuPont's Nafion and similar products, for imparting ionomeric character to various polymers is a vinyl ether terminated by a sulfonyl halide functionality, the sensitivity to base attack of the VDF copolymer formed therewith has prevented the development of a single-ion conducting ionomer based upon VDF. There simply is no means taught in the art for making the ionomer.

Doyle et al, U.S. Pat. No. 6,025,092, discloses ionomers formed with vinylidene fluoride copolymers by subjecting sulfonyl fluoride containing precursors to hydrolysis with alkali and alkaline earth metal carbonates, such as lithium carbonate, under mildly basic conditions. The method of Doyle et al, however is limited in that any excess over stoichiometric amounts of the hydrolyzing agent results in attack on the VDF backbone, causing polymer degradation. Thus the method of Doyle et al is limited in industrial applicability.

Barton et al, WO 0052085A1, discloses melt processible compositions comprising alkali metal ionomers having vinylidene fluoride monomer units, and liquids imbibed therewithin. The ionomers of Barton et al are not melt processible without incorporation of the liquids.

SUMMARY OF THE INVENTION

The present invention provides for an ionomer comprising monomer units of vinylidene fluoride and 0.5–50 mole % of a perfluoroalkenyl monomer having a pendant group of the formula $-(O-CF_2CFR)_aO-CF_2(CFR')_bSO_3^-NH_4^+$ wherein R and R' are independently selected from F, Cl or a perfluorinated alkyl group having 1 to 10 carbon atoms, a=0, 1 or 2, b=0 to 6.

The present invention also provides for a process for forming an ionomer comprising contacting a polymer comprising
monomer units of vinylidene fluoride and 0.5–50 mole % of a perfluoroalkenyl monomer having a pendant group of the formula $-(O-CF_2CFR)_aO-CF_2(CFR')_bSO_2F$ wherein R and R' are independently selected from F, Cl or a perfluorinated alkyl group having 1 to 10 carbon atoms, a=0, 1 or 2, b=0 to 6,
with an excess of a solution of ammonium carbonate for a period of time sufficient to obtain the degree of conversion desired to the ammonium sulfonate form of the polymer.

DETAILED DESCRIPTION OF THE INVENTION

For the purposes of description in the present invention, the generic term "ionomer" will be taken to encompass the ammonium sulfonate and the sulfonic acid forms of the polymer of the invention, as well as the alkali and alkaline earth salts thereof. For the purpose of the present invention, the term "excess" when applied to the ammonium carbonate solution of the present invention means that the solution contains more, preferably many fold, more than the amount of ammonium carbonate necessary to achieve complete hydrolysis of the sulfonyl fluoride to the sulfonate based upon reaction stoichiometry. That is, "excess" means beyond, preferably many fold beyond, the stoichiometric amount.

The term "substantially fluorinated" means that at least 50 mole % of the hydrogens of the corresponding polyethylene backbone have been replaced by fluorines.

In one aspect of the present invention the sulfonyl fluoride-containing precursor polymer is contacted with a many fold excess of ammonium carbonate solution, effecting the hydrolysis of the sulfonyl fluoride to the ammonium sulfonate without degradation of the polymer backbone. In another aspect of the present invention, the ammonium sulfonate ionomer may be melt processed, such as by thermal consolidation of ammonium sulfonate ionomer of the invention into a shaped article such as a polymer film, without the addition of any liquid to the polymer.

Means for forming the ammonium sulfonate ionomer into a film, sheet or other shaped article include melt pressing and extrusion using a screw extruder. Other means include roll milling and such other means well-known in the art of plastics processing for forming shaped articles of thermoplastic polymers. The ammonium sulfonate ionomer of the invention can also be formed into shaped articles according to solution methods disclosed in the art such as by dissolution in a solvent followed by solution casting of a film or sheet upon a substrate. However melt processing is preferred.

In an alternative embodiment of the present invention, the sulfonyl fluoride form of the polymer is first melt-formed into a sheet and then contacted with an excess of ammonium carbonate solution to effect hydrolysis to the ammonium sulfonate ionomer.

In a further embodiment, the ammonium sulfonate ionomer is contacted with a mineral acid, preferably an aqueous mineral acid, such as nitric acid, to form the sulfonic acid ionomer which is useful in fuel cells. In yet a further embodiment of the invention, the sulfonic acid ionomer is contacted with a solution, preferably an aqueous solution, of an alkali metal salt, such as LiCl, to form the alkali sulfonate ionomer useful in various electrochemical cells such as lithium batteries.

In a further embodiment, the ammonium ionomer may be contacted with a solution, preferably an aqueous solution, of an alkali metal salt such as LiCl to form the alkali metal ionomer by ion exchange. It is preferred, however, to first form the sulfonic acid followed by ion exchange to form the alkali metal, preferably the lithium, ionomer.

In all said foregoing embodiments, it is preferred that the ionomer undergoing the ion exchange processes be in the form of a film or sheet.

In the process of the invention vinylidene fluoride (VDF) is copolymerized with a non-ionic monomer (I) represented by the formula $$CF_2=CF-(O-CF_2CFR)_aO-CF_2(CFR')_bSO_2F \qquad (I)$$

where R and R' are independently selected from F, Cl or a fluorinated, preferably perfluorinated, alkyl group having 1 to 10 carbon atoms, a=0, 1 or 2, b=0 to 6. Preferably R is trifluoromethyl, R' is F, a=1 and b=1. In the process of the invention, the copolymer so formed is contacted with an excess of a solution of ammonium carbonate to form an ionomer comprising monomer units of VDF and 0.5–50 mole %, preferably 0.5–36 mole %, of an ionic perfluoroalkenyl monomer having a pendant group of the formula $-(O-CF_2CFR)_aO-CF_2(CFR')_bSO_3^-NH_4^+$ where R and R' are independently selected from F, Cl or a perfluorinated alkyl group having 1 to 10 carbon atoms, a=0, 1 or 2, b=0 to 6. Preferably, R is trifluoromethyl, R' is F, a=0 or 1, b=1.

The ammonium carbonate solution suitable for use in the present invention is a solution formed by adding ammonium carbonate to water, alcohol, organic carbonate, or mixtures thereof. Suitable alcohols include but are not limited to methanol, ethanol and butanol. Suitable carbonates include but are not limited to ethylene carbonate and propylene carbonate. Preferably the ammonium carbonate is dissolved in a mixture of methanol and water.

A preferred hydrolysis process of the invention comprises contacting the sulfonyl fluoride-containing polymer with an excess of a solution of ammonium carbonate in methanol (optionally containing another solvent such as water), in the range of ca. 0–85° C., preferably room temperature to 65° C. for a sufficient length of time to convert the desired percentage of sulfonyl fluoride to ammonium sulfonate.

Generally preferred are the mildest hydrolysis conditions possible consistent with timely conversion of the sulfonyl fluoride. The severe hydrolysis conditions taught in the art for hydrolyzing sulfonyl fluoride to sulfonate in the case of ionomers which do not include VDF, cause degradation of the VDF-containing copolymer in the present invention. The degree of conversion can be conveniently monitored by the disappearance of the characteristic infrared absorption band for the sulfonyl fluoride group at about 1462 cm$^{-1}$. Alternatively, $^{19}$F NMR spectroscopy may be used as described in the examples.

The ionomers prepared by the process of the invention include copolymer compositions in which the ionic monomer unit is present in the ionomer of the invention at concentrations ranging from 0.5 to 50 mole %, preferably 0.5–36 mole %.

Other cationic forms of the ion-exchange membrane can be achieved using ion-exchange procedures commonly known in the art and as outlined herein above (see for example Ion Exchange by F. Helfferich, McGraw Hill, New York 1962). For example, the protonic form of the membrane is preferably obtained by immersing the ammonium-ionomer into an aqueous acid.

Silver and copper sulfonate ionomers can be made by ion exchange with the ammonium sulfonate form of the polymer. For example, repeated treatment of the ammonium sulfonate ionomer with an aqueous solution of a silver salt such as silver fluoride or silver perchlorate would produce at least a partially cation exchanged silver sulfonate ionomer. In a similar fashion, the cuprous sulfonate ionomer can be produced by repeated treatment of the ammonium sulfonate ionomer with an aqueous acidic solution of a copper salt such as cuprous chloride.

In many applications, the ionomer is preferably formed into a film or sheet. Films of the ionomer may be formed according to processes known in the art. In one embodiment, the thermoplastic sulfonyl fluoride precursor is extrusion melt cast onto a cooled surface such as a rotating drum or roll, whence it is subject to hydrolysis according to the process of the invention. In a second embodiment, a sulfonyl fluoride-containing polymer is dissolved in a solvent, the solution cast onto a smooth surface such as a glass plate using a doctor knife or other device known in the art to assist in depositing films on a substrate, and the resultant film subject to hydrolysis according to the process of the invention. In a third embodiment, the sulfonyl fluoride copolymer resin is subject to hydrolysis by dissolution or suspension in a hydrolyzing medium, followed by optional addition of cosolvent, and filtration or centifugation of the resulting mixture, and finally solvent casting of the ionomer solution onto a substrate using a doctor knife or other device known in the art to assist in depositing films on a substrate.

In an alternative embodiment, it is found in the practice of the present invention that the ammonium ionomer is particularly amenable to melt forming. Thus, the ammonium ionomer may be isolated in the form of a powder, and the powder melt formed into a film or sheet which may then be subject to ion exchange according to the methods taught herein.

The ionomers prepared according to the practice of the invention may be terpolymers. Suitable third monomers include tetrafluoroethylene, chlorotrifluoroethylene, ethylene, hexafluoropropylene, trifluoroethylene, vinyl fluoride, vinyl chloride, vinylidene chloride, perfluoroalkylvinyl ethers of the formula $CF_2=CFOR_f$ where $R_f=CF_3$, $C_2F_5$ or $C_3F_6$. Preferred termonomers include tetrafluoroethylene, hexafluoropropylene, ethylene and the perfluoroalkylvinyl ethers. Termonomers are preferably present in the polymer at a concentration of up to 30 mole %.

EXAMPLES

All chemicals were used as received unless stated otherwise.

The following terms and abbreviations are used in the examples. The abbreviation "VF2" refers to the monomer 1,1-difluoroethene. The abbreviation "PSEPVE" refers to 2-[1-[difluoro[(trifluoroethenyl)oxy]methyl]-1,2,2,2-tetrafluoroethoxy]-1,1,2,2-tetrafluroethanesulfonyl fluoride. The term "MeOH" refers to methyl alcohol.

Differential scanning calorimetry (DSC) was performed according to ASTM D4591, in a nitrogen atmosphere and at a heating rate of 20° C./minute, using a TA Instruments Model 2910.

$^{19}$F NMR spectra were recorded using a Bruker AVANCE DRX 400 spectrometer.

The below examples were performed on polymer powder which can be pressed into good films. Films can also be hydrolyzed directly by immersing them in an ammonium carbonate bath (MeOH/H$_2$O) using this method.

Example 1

Hydrolysis of PSEPVE/VF2 Copolymer Using Excess Ammonium Carbonate in MeOH/H2O

A 4 liter horizontal, stainless-steel stirred polymerization reactor equipped with a 4-bladed agitator was flushed with nitrogen and charged with 1.65 liter of demineralized water and 6 g of ammonium perfluorooctanoate. The reactor was sealed, pressurized with nitrogen to 100 psig and then vented to 0 psig. This pressure/venting cycle was repeated twice. The reactor was then evacuated to −14 psig then purged with vinylidene difluoride (VF2) to 0 psig. This evacuation/purge cycle was repeated two times. At 0 psig of VF2 in the reactor, 20 ml of an aqueous PSEPVE emulsion (containing 10 g PSEPVE) was injected into the reactor. The reactor contents were agitated at 200 rpm and heated to 60° C. The reactor was pressurized with VF2 to 300 psig at which time 0.9 g potassium persulfate dissolved in 20 ml demineralized water was injected at 10 ml/min. The polymerization initiated in 0.07 hr.

A mixture of VF2 and PSEPVE (as PSEPVE emulsion containing 0.5 g PSPEVE/ml) in a 1:1 mole ratio was fed to the reactor at about the rate at which it was consumed maintaining about 300 psig pressure in the reactor. The reaction was continued in this manner until about 215 g of PSEPVE were fed to the reactor. The feeding of PSEPVE was then discontinued and VF2 was fed to the reactor at about the rate at which it was consumed maintaining about 300 psig pressure in the reactor, until an overall total of 334 g VF2 had been fed to the reactor.

The reactor contents were cooled to ambient temperature, vented to 0 psig and discharged as a milky-white polymer emulsion containing 22 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer was dried at 100° C. under partial vacuum with a sweep of nitrogen to yield 520 g of white granular polymer. DSC analysis showed a glass transition temperature at −24° C. (at the inflection point) and a well defined crystalline melting point at 166° C. ($\Delta H_f$=22.2 J/g) on the second heat. Elemental analysis found: C, 30.41 wt % from which an average composition of 8.1 mole % PSPEVE and 91.9 mole % VF2 could be calculated. The polymer could be pressed into translucent white slabs and films at 200° C. that were clean and dense, free of voids or visible color.

A 3-necked 300 ml jacketed flask was equipped with a magnetic stir bar, condenser and nitrogen inlet. The flask was charged with 10 g (~10 mmole —SO$_2$F) of the PSEPVE/VF2 copolymer prepared above, 3.85 g (40 mmole) of ammonium carbonate and 100 ml of MeOH/H$_2$O (50 v %). With gentle stirring, the reaction mixture was heated to 50° C. for 24 hr, then cooled to room temperature.

The polymer was collected by filtration then washed 4 times by suspending in distilled water at 25° C. and filtering. The collected polymer was dried at 25° C. under vacuum to a white powder. By $^{19}$Fnmr analysis (DMF-d7), 100% of the —SO$_2$F was converted and the polymer contained 8.2 mole % PSEPVE. The polymer could be pressed at 200° C. into a thin film (5–10 mil) which was colorless, clear and tough.

Example 2

Hydrolysis of PSEPVE/VF2 Copolymer Film Using Excess Ammonium Carbonate in MeOH/H2O and Conversion to the Sulfonic Acid Form A film, 0.005 in. to 0.007 in. thick, was prepared from the PSEPVE/VF2 copolymer powder prepared in Example 1 by melt pressing at 200° C. The film was supported between Teflon™ mesh to prevent it from folding on itself and immersed for 24 hr in a 1-liter stirred bath containing a 0.4 molar ammonium carbonate solution in 1:1 methanol/water at 50° C. At the end of this period, the supported film assembly was removed from the ammonium carbonate solution, rinsed with several portions of demineralized water, then immersed for 18 hr in a second 1-liter stirred bath containing 3 molar nitric acid at 70° C. At the end of this period, the supported film assembly was removed from the nitric acid solution, rinsed with several portions of demineralized water, then immersed in boiling demineralized water for 2 hr. The water was changed several times during the boiling to remove residual nitric acid. At the end of this period, the supported film assembly was removed from the boiling demineralized water and immediately immersed in fresh demineralized water at ambient temperature. A 1.0 by 1.5 cm$^2$ section of the film was blotted dry and assembled into a conductivity cell. Proton ion conductivity was measured at ambient conditions according to the method of Sone et al, J. Electrochem. Soc 143, 1254 (1996), and determined to be equal to $81 \times 10^{-3}$ S/cm.

Example 3

Hydrolysis of PSEPVE/VF2 Copolymer Using Excess Ammonium Carbonate in MeOH/H2O Example 1 was repeated, but heating was at 60° C. for 24 hr for this example. By $^{19}$Fnmr analysis (DMF-d7), 100% of the —SO$_2$F was converted and the polymer contained 7.6 mole % PSEPVE.

Example 4

Hydrolysis of PSEPVE/VF2 Copolymer Using Stoichiometric Ammonium Carbonate in MeOH A 4 liter horizontal, stainless-steel stirred polymerization reactor equipped with a 4-bladed agitator, was flushed with nitrogen and charged with 1.65 liter of demineralized water and 6 g of ammonium perfluorooctanoate. The reactor was sealed, pressurized with nitrogen to 100 psig and then vented to 0 psig. This pressure/venting cycle was repeated twice. The reactor was evacuated to −14 psig then purged with vinylidene difluoride (VF2) to 0 psig. This evacuation/purge cycle was repeated twice. At 0 psig of VF2 in the reactor, 20 ml of an aqueous PSEPVE emulsion (containing 10 g PSEPVE) was injected into the reactor. The reactor contents were agitated at 200 rpm and heated to 60° C. The reactor was pressurized with VF2 to 300 psig at which time 0.9 g potassium persulfate dissolved in 20 ml demineralized water was injected at 10 ml/min. The polymerization initiated in 0.05 hr. A mixture of VF2 and PSEPVE (as PSEPVE emulsion containing 0.5 g PSPEVE/ml) in a 4:1 mole ratio was fed to the reactor at about the rate at which it was consumed maintaining about 300 psig pressure in the reactor. The reaction was continued in this manner until about 215 g of PSEPVE were fed to the reactor. The feeding of PSEPVE was then discontinued and VF2 was fed to the reactor at about the rate at which it was consumed maintaining about 300 psig pressure in the reactor, until an overall total of 334 g VF2 had been fed to the reactor. The reactor contents were cooled to ambient temperature, vented to 0 psig and discharged as a milky-white polymer emulsion containing 22 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 551 g of white granular polymer. DSC analysis showed a glass transition temperature at −26° C. and a well defined crystalline melting point at 160° C. ($\Delta H_f$=15.9 J/g) on the second heat. Elemental analysis found: C, 30.28 wt % from which an average composition of 8.3 mole % PSEPVE and 91.7 mole % VF2 could be calculated. The polymer could be pressed into translucent white slabs and films at 200° C. that were clean and dense, free of voids or visible color.

A 3-necked 3000 ml flask was equipped with an overhead stirrer, heating mantle, dropping funnel, distillation head and nitrogen inlet. The flask was charged with 50 g (44 mmole —SO$_2$F) PSEPVE/VF2 copolymer prepared above, 4.2 g (44 mmole) of ammonium carbonate and 750 ml of MeOH. The reaction mixture was stirred at 25° C. for 24 hr. The reaction mixture was heated to reflux to distill off the MeOH. Toluene was added through the dropping funnel to maintain the fluid level in the flask. The distillation was continued until the distillate contained <1% MeOH by GLC analysis at which time heating was discontinued and the reaction mixture was cooled to 25° C. with stirring. The polymer was collected by filtration and washed on the filter with 500 ml toluene. The collected polymer was dried at 25° C. under vacuum to a white powder. By $^{19}$Fnmr analysis (DMF-d7), 100% of the —SO$_2$F was converted and the polymer contained 9.5 mole % PSEPVE.

Comparative Examples

Comparative examples show other alkali metal carbonates or tetraalkyl ammonium carbonates are either ineffective at —SO$_2$F hydrolysis or degrade the polymer by discoloration and loss of PSEPVE.

Comparative Example A

Hydrolysis of PSEPVE/VF2 Copolymer Using Excess Lithium Carbonate in MeOH/H2O This example demonstrates that lithium carbonate is ineffective at complete hydrolysis of the sulfonyl fluoride moiety under the conditions of Example 1.

A 3-necked 300 ml jacketed flask was equipped with a magnetic stir bar, condenser and nitrogen inlet. The flask was charged with 5 g (~5 mmole —SO$_2$F) of the PSEPVE/VF2 copolymer powder prepared in Example 1, 1.5 g (20 mmole) lithium carbonate and 50 ml MeOH/H$_2$O (50 v %). With gentle stirring, the reaction mixture was heated to 50° C. for 24 hr, then cooled to room temperature. The polymer was collected by filtration then washed 4 times by suspending in distilled water at 25° C. and filtering. The collected polymer was dried at 25° C. under vacuum to a white powder. By $^{19}$Fnmr analysis (DMF-d7), only 17% of the —SO$_2$F was converted and the polymer contained 8.2 mole % PSEPVE.

Comparative Example B

Hydrolysis of PSEPVE/VF2 Copolymer Using Excess Lithium Carbonate in MeOH/H2O

This example demonstrates that lithium carbonate is ineffective at complete hydrolysis of the sulfonyl fluoride moiety under the conditions of Example 3.

Comparative Example A was repeated, but heated 60° C./24 hr for this example. By $^{19}$Fnmr analysis (DMF-d7), 28% of the —SO$_2$F was converted and the polymer contained 7.9 mole % PSEPVE.

Comparative Example C

Hydrolysis of PSEPVE/VF2 Copolymer Using Excess Sodium Carbonate in MeOH/H2O

This example demonstrates that sodium carbonate hydrolysis of the sulfonyl fluoride moiety under the conditions of Example 1 results in degradation of the starting polymer as evidenced by the substantial loss of functional comonomer.

A 3-necked 300 ml jacketed flask was equipped with a magnetic stir bar, condenser and nitrogen inlet. The flask was charged with 10 g (~10 mmole —SO$_2$F) of the PSEPVE/VF2 copolymer powder prepared in Example 1, 4.25 g (40 mmole) sodium carbonate and 100 ml MeOH/H$_2$O (50 v %). With gentle stirring, the reaction mixture was heated to 50° C. for 24 hr, then cooled to room temperature. The polymer was collected by filtration then washed 4 times by suspending in distilled water at 25° C. and filtering. The collected polymer was dried at 25° C. under vacuum to a yellow powder. By $^{19}$Fnmr analysis (DMF-d7), 100% of the —SO$_2$F was converted and the polymer contained only 5.9 mole % PSEPVE. The polymer could be pressed at 200° C. into a thin film (5–10 mil) which was colored.

Comparative Example D

Hydrolysis of PSEPVE/VF2 Copolymer Using Excess Sodium Carbonate in MeOH/H2O

This example demonstrates that sodium carbonate hydrolysis of the sulfonyl fluoride moiety under the conditions of Example 3 results in degradation of the starting polymer as evidenced by the substantial loss of functional comonomer.

Comparative Example C was repeated, but heated 60° C./24 hr for this example. By $^{19}$Fnmr analysis (DMF-d7), 100% of the —SO$_2$F was converted and the polymer contained only 5.1 mole % PSEPVE.

Comparative Example E

Hydrolysis of PSEPVE/VF2 Copolymer Using Excess Potassium Carbonate in MeOH/H2O

This example demonstrates that potassium carbonate is ineffective at complete hydrolysis of the sulfonyl fluoride moiety under the conditions of Example 1. And further, this example demonstrates that potassium carbonate hydrolysis of the sulfonyl fluoride moiety under the conditions of Example 1 results in degradation of the starting polymer as evidenced by the substantial loss of functional comonomer.

A 3-necked 300 ml jacketed flask was equipped with a magnetic stir bar, condenser and nitrogen inlet. The flask was charged with 25 g (~25 mmole —SO$_2$F) of the PSEPVE/VF2 copolymer powder prepared in Example 1, 13.8 g (100 mmole) potassium carbonate and 250 ml MeOH/H$_2$O (50 v %). With gentle stirring, the reaction mixture was heated to 50° C./22 hr, then cooled to room temperature. The polymer was collected by filtration then washed 4 times by suspending in distilled water at 25° C. and filtering. The collected polymer was dried at 25° C. under vacuum to a yellow powder. By $^{19}$Fnmr analysis (DMF-d7), 87% of the —SO$_2$F was converted and the polymer contained only 6.1 mole % PSEPVE. The polymer could be pressed at 200° C. into a thin film (5–10 mil) which was colored.

Comparative Example F

Hydrolysis of PSEPVE/VF2 Copolymer Using Excess Potassium Carbonate in MeOH/H2O

This example demonstrates that potassium carbonate hydrolysis of the sulfonyl fluoride moiety under the conditions of Example 3 results in degradation of the starting polymer as evidenced by the substantial loss of functional comonomer.

Comparative Example E was repeated, but heated 60° C./18 hr for this example. By $^{19}$Fnmr analysis (DMF-d7), 100% of the —SO$_2$F was converted and the polymer contained only 5.6 mole % PSEPVE.

Comparative Example G

Hydrolysis of PSEPVE/VF2 Copolymer Using Excess Tetramethylammonium Carbonate in MeOH/H$_2$O This example demonstrates that tetramethylammonium carbonate is ineffective at complete hydrolysis of the sulfonyl fluoride moiety under the conditions of Example 1. And further, this example demonstrates that tetramethylammonium carbonate hydrolysis of the sulfonyl fluoride moiety under the conditions of Example 1 results in degradation of the starting polymer as evidenced by the substantial loss of functional comonomer.

A 4-L horizontal, stainless-steel stirred polymerization reactor equipped with 4-bladed agitator, was flushed with nitrogen and charged with 1.65 liter of demineralized water and 6 g of ammonium perfluorooctanoate. The reactor was sealed, pressurized with nitrogen to 100 psig and then vented to 0 psig. This pressure/venting cycle was repeated twice. The reactor was evacuated to −14 psig then purged with vinylidene difluoride (VF2) to 0 psig. This evacuation/purge cycle was repeated twice. At 0 psig of VF2 in the reactor, 20 ml of an aqueous PSEPVE emulsion (containing 10 g PSEPVE) was injected into the reactor. The reactor contents were agitated at 200 rpm and heated to 60° C. The reactor was pressurized with VF2 to 300 psig at which time 0.9 g potassium persulfate dissolved in 20 ml demineralized water was injected at 10 ml/min. The polymerization initiated in 0.06 hr. A mixture of VF2 and PSEPVE (as PSEPVE emulsion containing 0.5 g PSPEVE/ml) in a 2:1 mole ratio was fed to the reactor at about the rate at which it was consumed maintaining about 300 psig pressure in the reactor. The reaction was continued in this manner until about 215 g of PSEPVE were fed to the reactor. The feeding of PSEPVE was then discontinued and VF2 was fed to the reactor at about the rate at which it was consumed maintaining about 300 psig pressure in the reactor, until an overall total of 332 g VF2 had been fed to the reactor. The reactor contents were cooled to ambient temperature, vented to 0 psig and discharged as a milky-white polymer emulsion containing 22 wt % polymer. The polymer emulsion was frozen to cause agglomeration of the polymer particles and their separation from the aqueous phase. The polymer agglomerates were filtered and washed vigorously 4 times with filtered tap water at about 50° C. then with demineralized water at ambient temperature. The washed polymer agglomerates were dried at 100° C. under partial vacuum with a sweep of nitrogen to yield 524 g of white granular polymer. DSC analysis showed a glass transition temperature at −23° C. at inflection and a well defined crystalline melting point at 165° C. ($\Delta H_f$=20.0 J/g) on the second heat. Elemental analysis found: C, 30.33 wt % from which an average composition of 8.2 mole % PSEPVE and 91.8 mole % VF2 could be calculated. The polymer could be pressed into translucent white slabs and films at 200° C. that were clean and dense, free of voids or visible color.

A 100 ml flask was equipped with reflux condenser, magnetic stir bar and nitrogen inlet. The flask was charged with 5.0 g (~5 mmole —$SO_2F$) PSEPVE/VF2 containing 8.4 mole % PSEPVE by $^{19}$Fnmr, 4.25 g (20 mmole) tetramethylammonium carbonate and 50 ml MeOH/$H_2O$ (50 v %). With gentle stirring, the reaction mixture was heated to 50° C. for 24 hr, then cooled to room temperature. The polymer was collected by filtration then washed 4 times by suspending in distilled water at 25° C. and filtering. The collected polymer was dried at 25° C. under vacuum to yield 4.12 g (17.6% wt loss) of a discolored, dark amber powder. By $^{19}$Fnmr analysis (DMF-d7), 73% of the —$SO_2F$ was converted and the polymer contained only 5.0 mole % PSEPVE.

Comparative Example H

Hydrolysis of PSEPVE/VF2 Copolymer Using Excess Tetraethylammonium Carbonate in MeOH/$H_2O$ This example demonstrates that tetraethylammonium carbonate is ineffective at complete hydrolysis of the sulfonyl fluoride moiety under the conditions of Example 1.

A 100 ml flask was equipped with reflux condenser, magnetic stir bar and nitrogen inlet. The flask was charged with 5.0 g (~5 mmole —$SO_2F$) of the PSEPVE/VF2 copolymer powder prepared in Comparative Example G, 6.4 g (20 mmole) tetraethylammonium carbonate and 50 ml MeOH/$H_2O$ (50 v %). With gentle stirring, the reaction mixture was heated to 50° C. for 24 hr, then cooled to room temperature. The polymer was collected by filtration then washed 4 times by suspending in distilled water at 25° C. and filtering. The collected polymer was dried at 25° C. under vacuum to yield 4.78 g (4.8% wt loss) of a white powder. By $^{19}$Fnmr analysis (DMF-d7), only 28% of the —$SO_2F$ was converted and the polymer contained 8.6 mole % PSEPVE.

What is claimed is:

1. A process for forming an ionomer, comprising
   contacting a polymer comprising
      monomer units of vinylidene fluoride and 0.5–50 mole % of a perfluoroalkenyl monomer having a pendant group of the formula

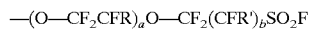

wherein R and R' are independently selected from F, Cl or a perfluorinated alkyl group having 1 to 10 carbon atoms, a=0, 1 or 2, b=0 to 6,
   with an excess of a solution of ammonium carbonate for a period of time sufficient to obtain the degree of conversion desired to the ammonium sulfonate form of the polymer, thereby forming an ammonium ionomer.

2. The process of claim 1 wherein the ammonium carbonate is dissolved in a mixture of methanol and water.

3. The process of claim 1 further comprising the step of contacting said ammonium ionomer with a mineral acid to form a sulfonic acid ionomer.

4. The process of claim 3 further comprising the step of contacting said sulfonic acid ionomer with a solution of an alkali metal salt.

5. The process of claim 1 further comprising the step of contacting said ammonium ionomer with a solution of an alkali metal salt.

6. The process of claim 4 wherein the alkali metal salt is LiCl.

7. The process of claim 5 wherein the alkali metal salt is LiCl.

8. The process of claim 1 further comprising the step of forming said polymer into a flat film or sheet prior to contacting with said solution of ammonium carbonate.

9. The process of claim 1 further comprising the step of melt forming said ammonium ionomer into a shaped article.

10. The process of claim 9 wherein said shaped article is a flat film or sheet.

11. The process of claim 10 wherein the melt forming is accomplished by melt pressing.

12. The process of claim 10 wherein the melt forming is accomplished by extrusion.

13. The process of claim 3 wherein the ionomer is in the form of flat film or sheet.

14. The process of claim 4 wherein the ionomer is in the form of flat film or sheet.

15. The process of claim 5 wherein the ionomer is in the form of flat film or sheet.

* * * * *